(12) United States Patent
Goto et al.

(10) Patent No.: US 8,076,020 B2
(45) Date of Patent: Dec. 13, 2011

(54) BATTERY MODULE

(75) Inventors: Takeyuki Goto, Ibaraki (JP); Toshiaki Onuki, Saitama (JP); Tunemi Aiba, Gunma (JP); Koutarou Ikeda, Ibaraki (JP)

(73) Assignee: Hitachi Vehicle Energy, Ltd., Ibaraki (JP)

( * ) Notice: Subject to any disclaimer, the term of this patent is extended or adjusted under 35 U.S.C. 154(b) by 555 days.

(21) Appl. No.: 11/610,206

(22) Filed: Dec. 13, 2006

(65) Prior Publication Data

US 2007/0141459 A1 Jun. 21, 2007

(30) Foreign Application Priority Data

Dec. 15, 2005 (JP) ................................. 2005-361464

(51) Int. Cl.
*H01M 4/48* (2010.01)
(52) U.S. Cl. .......... 429/129; 429/62; 429/231; 429/192; 429/194; 320/112; 320/136
(58) Field of Classification Search .................. 429/129; 320/112
See application file for complete search history.

(56) References Cited

U.S. PATENT DOCUMENTS

| | | | | | |
|---|---|---|---|---|---|
| 5,456,994 | A | * | 10/1995 | Mita | ................................ 429/71 |
| 6,335,116 | B1 | * | 1/2002 | Yamane et al. | ................ 429/176 |
| 6,340,877 | B1 | * | 1/2002 | Mita et al. | .................... 320/112 |
| 6,472,098 | B1 | * | 10/2002 | Sawada et al. | ................. 429/163 |
| 6,498,406 | B1 | * | 12/2002 | Høriuchi et al. | ............... 307/150 |
| 2004/0058233 | A1 | * | 3/2004 | Hamada et al. | ................ 429/159 |
| 2008/0124622 | A1 | * | 5/2008 | Hamada et al. | ................ 429/149 |

FOREIGN PATENT DOCUMENTS

| | | | |
|---|---|---|---|
| EP | 574628 A1 | * | 12/1993 |
| JP | 10-270006 A | | 10/1998 |
| JP | 2001-185103 | | 7/2001 |
| JP | 2005-042742 | * | 2/2005 |
| JP | 2006-099997 | * | 4/2006 |

OTHER PUBLICATIONS

Translation of the Notice of Reasons for Rejection, i.e. Office Action issued on Nov. 30, 2010 by the Japanese Patent Office in corresponding application No. 2005-361464.

* cited by examiner

*Primary Examiner* — Melvin Mayes
*Assistant Examiner* — Colette Nguyen
(74) *Attorney, Agent, or Firm* — Roberts Mlotkowski Safran & Cole, P.C.; Thomas W. Cole (57) ABSTRACT

The present invention provides to a battery module which is excellent in cooling performance of a battery and is improved in assembling easiness at low cast. A battery module 3 accommodates assembled battery blocks 20 arranged in series in an exterior case formed in an approximately hexahedral shape in parallel, each assembled battery block 20 including six assembled battery units electrically connected in series and each assembled battery unit including four cylindrical unit cells arrange such that their polarities are alternating. An exterior case is formed by connecting a lower lid 22 having a front face, a bottom face, and a back face and an upper lid 41 having a left side face, an upper face, and a right side face. End portions of the left side face, the upper face, and the right side face of the upper lid are drawn at the sides of the front face and the back face of the lower lid.

14 Claims, 9 Drawing Sheets

BATTERY MODULE

FIELD OF THE INVENTION

The present invention relates to a battery module, and in particular to a battery module where a plurality of assembled batteries are accommodated in an exterior case formed in an approximately hexahedral or cubic shape, each assembled battery including a plurality of cylindrical unit cells electrically connected such that polarities thereof are alternating.

DESCRIPTION OF THE RELATED ART

Conventionally, a high performance secondary cell or battery such as a nickel hydride battery or a lithium battery is used as a mobile power source for an electric vehicle or the like. In such a secondary battery, it is necessary to detect voltages of individual unit cells therein for grasping a battery performance of the secondary battery. Further, since the number of cells to be used increases, an assembling work for a battery power source apparatus (a battery module) is complicated. Furthermore, since an amount of heat generation during use of the module is relatively large and the battery performance has temperature dependency, it is necessary to improve a cooling easiness of the battery and assembling easiness.

Therefore, JP-A-10-270006 has proposed a battery module including a slender cylindrical assembled battery prepared by electrically connecting a plurality of cylindrical secondary cells linearly and provided with a holder case accommodating the assembled batteries in a plurality of rows.

The holder case is made from plastic material and is formed in a square-shaped box shape whose upper and lower portions are opened, and has circular through-holes for accommodating and holding assembled batteries formed at both ends thereof. After assembled batteries are accommodated in the holder case, electrical connection between the assembled batteries are performed by positioning resin plates having a copper plate preliminarily inserted in a predetermined portion at both ends of the holder case. Since many assembled batteries are evenly disposed and temperature differences among unit cells constituting the battery module occur, forcible cooling using air is performed on unit cells, and cooling air is introduced from a lower portion of the holder case accommodating the assembled batteries to be discharged from an upper portion thereof. A cover-shaped rectifying louver is disposed on an introduction side of cooling air so as not to cool unit cells as much as possible and a rectifying louver is disposed on a discharge side of the cooling air so as to throttle an air flow path in order to increase a flow rate of the cooling air to improve heat exchange rate. By disposing the rectifying louvers different in shape properly according to arrangement portion of the assembled batteries, a cooling system for unifying temperatures of respective unit cells in the battery module is constituted.

However, since the above-described battery module uses cylindrical assembled batteries formed by connecting cylindrical unit cells linearly in series, assembled batteries must be manufactured to have a stable size in order to connect assembled batteries using the copper bar inserted in the resin plate. Therefore, high precision is required in height of individual unit cells in size of connecting members. When assembled batteries are disposed in the holder case, since a work for inserting the assembled batteries into a circular hole provided in the holder case is required and complicated work is required due to a high number of assembled batteries to be used, safety in connecting work may be lowered correspondingly. Further, since rectifying louvers different in shape are disposed among respective unit batteries, the number of kinds of parts is increased so that it is troublesome to arrange the parts at predetermined position and the louvers including many curves are formed in complicated shapes so that they are relatively high.

SUMMARY OF THE INVENTION

In view of these circumstances, an object of the present invention is to provide a battery module which is excellent in cooling easiness of cells and whose assembling easiness has been improved at a low cost.

In order to solve the problem, according to the present invention, there is provided a battery module where a plurality of assembled batteries are accommodated in an exterior case formed in an approximately hexahedral shape, each assembled battery including a plurality of cylindrical unit cells electrically connected such that polarities thereof are alternating, wherein the exterior case is formed by combining a lower lid having a front face, a bottom face and a back face, and an upper lid having a left side face, an upper face and a right side face.

Generally, in arrangement and fixation of a plurality of assembled batteries in a lower lid, when the lower lid has a box shape having a deep bottom, such a work must be conducted that the plurality of assembled batteries are inserted therein. Therefore, an inserting and fixing work itself becomes much troublesome and a connecting work conducted thereafter lowers due to interference of walls (the front face, the back face, the left side face, and the right side face) of the exterior case. On the contrary, when a plurality of assembled batteries are arranged and fixed on a plate-like lower lid, not only a inserting work but also a fixing work are simplified, but since it is thought that placing of the upper lid is the same as insertion in invisible state, safety in assembling work of the battery module reaching a high voltage may be blocked. In the present invention, the exterior case formed in an approximately hexahedral or cubic shape is constituted by connecting the lower lid with three faces of the front face, the bottom face, and the back face and the upper lid with three faces of the left side face, the upper face, and the right side face to each other as tradeoff between the above-described cases. Since the lower lid has the front face, the bottom face, and the rear face, the front face and the back face serve as walls. Therefore, arrangement and fixation of a plurality of assembled batteries means a work considerably similar to arrangement of assembled batteries on the plate-like lower lid corresponding to the latter case, so that workability is improved owing to opened space by utilizing the left side face and the right side face as working faces for the plurality of assembled batteries. Since the upper lid has three faces of the left side face, the upper face, and the right side face, two faces of the left and right side faces serve as walls, so that check with eyes can be performed from the front and back face directions when the upper lid should be fixed. Thus, safety can be improved like the former case. Further, since the upper lid and the lower lid each have three faces, cost reduction can be achieved as compared with the exterior case with the box structure having five faces corresponding to the former case.

In the present invention, when such a constitution is adopted that positive and negative electrode output line taking-out ports are provided at the front face of the exterior case, since the front face is provided on the lower lid. Therefore, the positive and negative electrode output line taking-out ports are disposed in the lower lid, so that erroneous wire connection can be prevented and safe electric connection can be performed by fixing positive and negative power lines before a plurality of assembled batteries are accommodated and fixed in the lower lid. When ventilation ports are provided in the front face and the back face of the exterior case, if ventilation passages communicating with the ventilation ports are formed in the lower lid in advance, formation of a cooling system is completed by only arranging a plurality of assembled batteries on the lower lid and connecting the upper lid to the lower lid, so that assembling easiness can be improved.

In the above aspect, when the lower lid and the upper lid are fixed to each other such that first flange portions extending from a bottom face portion of the lower lid laterally correspond to second flange portions extending from left and right side faces of the upper lid laterally, positioning of the upper lid and the lower lid is simplified owing to the first and second flange portions extending laterally so that workability is improved, and since flat faces are formed by the first and second flange portions, screw-fastening is facilitated. In this case, when a coupling portion between the lower lid and the upper lid directly contacts with a placement face of the exterior case, load exceeding force required for coupling of the lower lid and the upper lid is applied to the placement face when vibration or the like is applied thereto, there is a possibility that the coupling portion is broken. However, when the first flange portions are positioned above the bottom face of the lower lid, the coupling portion between the lower lid and the upper lid is positioned above the placement face of the exterior case, and a structure that the first flange portions do not contact with the placement face of the exterior case is obtained, so that breaking of the coupling portion due to vibration or the like is prevented and reliability of the coupling portion is improved. At this time, when end portions of the first flange portions are bent upwardly, rigidity is increased and structural strength is increased as compared with a flat end of the first flange portion, so that reduction in plate thickness and therefore decrease of the amount of material to be used can be achieved, and the weight of the lower lid and cost thereof can be reduced. Further, since the end portions are bent upwardly, positioning between the lower lid and the upper lid is facilitated when both the lids are coupled to each other, so that workability can be improved. When the end portions of the first flange portions have a waveform shape, rigidity to distortion such as bending is improved as compared with linear end portions. Further, when the second flanges are formed so as to conform to the wave shape of the end portion of the first flange portion, such a shape can be utilized for positioning at the coupling time of the lower lid and the upper lid, so that assembling easiness of the battery module can be improved. When end portions of the left side face, the upper face, and the right side face of the upper lid are drawn at the sides of the front face and the back face of the lower lid, structural strength is increased and the upper lid itself is reduced in distortion. Furthermore, reduction in plate thickness and decrease of the amount of material to be used can be achieved owing to rising of the strength so that weight and cost of the upper lid can be reduced.

When the assembled batteries are arranged and fixed between two frames whose sections have an approximate h-shape in section and which are opposed to each other in parallel with each other, since the frames have the approximate h-shaped sections, a plurality of assembled batteries can be fixed by flat faces with high section coefficient, which does not require a fixing member for each assembled battery. Therefore, weight reduction and space saving can be achieved and size variations of assembled batteries can be accommodated appropriately. When a group of assembled batteries is constituted by electrically connecting assembled batteries disposed and fixed between such frames, handling of the assembled batteries at an assembling step is facilitated, and when a plurality of such assembled battery groups are accommodated and fixed in parallel inside the exterior case, assembling easiness of the battery module can be considerably improved. At this time, the bottom faces of the assembled batteries are fixed by two approximate h-shaped frames, but when large impact is applied to the whole assembled battery group upwardly, respective assembled batteries may be vibrated individually in a fixed state only at the bottom faces of the assembled batteries. Therefore, when reinforcing plates with a approximate L-shape in section are arranged above the assembled battery groups so as to be parallel to the frames for arranging and fixing the assembled battery groups, a structure where large impacts in a vertical direction and in a horizontal direction can be endured can be obtained by the approximately L-shaped reinforcing plate which is stronger in lateral impact than a simple flat plate.

When the lower lid has cooling ducts corresponding to the respective assembled battery groups arranged and each cooling duct has ventilation holes at portions corresponding to spaces between respective adjacent unit cells constituting each assembled battery, such a structure that cooling air flows from a lower side upwardly between respective unit cells can be obtained. Since a temperature of cooling air passing through the cooling duct provided in the lower lid is constant, air with a constant temperature blows on respective unit cells so that cooling conditions to the unit cells are almost constant. However, when unit cells constituting an assembled battery are arranged in a multi-stage manner (they are stacked in a vertical direction), a cooling condition to unit cells positioned on an upper stage is problematic, but improvement can be obtained to a certain extent by supplementing a louver function in the assembled battery. By only disposing an assembled battery group obtained by assembled batteries with the same shape having a louver function therein to the lower lid having cooling ducts and ventilation holes, a considerably effective structure where a cooling system is completed is obtained, where it is unnecessary to change a louver shape for each unit cell so that simple assembling is made possible. At this time, it is preferable that opening areas of the ventilation holes are set such that their sizes decrease from one positioned nearest an introduction side of cooling air to one positioned toward to a discharge side of the cooling air, an approximate half of the ventilation hole nearest the introduction side is covered by an obliquely inclined rib, and the ventilation hole nearest the discharge side has an opening area approximately equal to that of the ventilation hole positioned nearest the introduction side. That is, the opening areas of the ventilation holes are set in principle so as to decrease from the introduction side of cooling air toward the discharge side thereof. Exceptionally, since such a phenomenon that vortex flow easily occurs on the introduction side of cooling air, which causes insufficient cooling of unit cells or excessive cooing thereof, adverse effect or overcooling is prevented by covering an approximate half of the ventilation hole nearest the introduction side with the obliquely inclined rib. Simultaneously therewith, since air (cooling air) heat-changed by forcible cooling is concentrated on the discharge side, sufficient effect can be obtained by only throttling the ventilation hole to increase a flow rate, and higher effect can be obtained by providing a large amount of air with lower temperature. Therefore, by setting the opening area of the ventilation hole nearest the discharge side to approximately equal to that of the ventilation hole nearest the introduction side, respective unit cells constituting assembled batteries of the assembled battery group are evenly cooled so that battery performances of respective unit cells can be made approximately even.

When the lower lid has a protrusion on its bottom face, and the upper lid has a recess at a portion corresponding to the protrusion such that the battery modules can be disposed in a stacked manner, battery modules can be disposed in a stacked manner by causing the protrusion of the lower lid bottom face to with the recess of the upper lid so that the battery modules can be disposed in a cubic manner instead of plan arrangement so that a utility rate of a space can be improved. Further, a plurality of retaining portions for retaining an approximately slender collar for allowing stacking and fixing of battery modules are formed on the left side face and the right side face of the upper lid.

BRIEF DESCRIPTION OF THE DRAWINGS

FIGS. 13A to 13D are graphs showing dispersion of unit cell surface temperatures in an assembled battery constituting the battery module, FIG. 13A being a graph showing dispersion of unit cell surface temperatures when opening areas of ventilation holes have been made equal, FIG. 13B being a graph showing dispersion of unit cell surface temperatures when an opening area of the ventilation hole on a discharge side of cooling air has been throttled, FIG. 13C being a graph showing dispersion of unit cell surface temperatures when a shielding louver has been disposed to the ventilation opening on an introduction side of cooling air, and FIG. 14D being a graph showing dispersion of unit cell surface temperatures when an opening area of the ventilation hole on the discharge side of cooling air has been increased and the shielding louver has been disposed to the ventilation opening on the introduction side;

DETAILED DESCRIPTION OF THE PREFERRED EMBODIMENTS

First Embodiment

A first embodiment where the present invention has been applied to a battery module for an electric vehicle will be explained below with reference to the drawings.

Constitution

Figure 1:
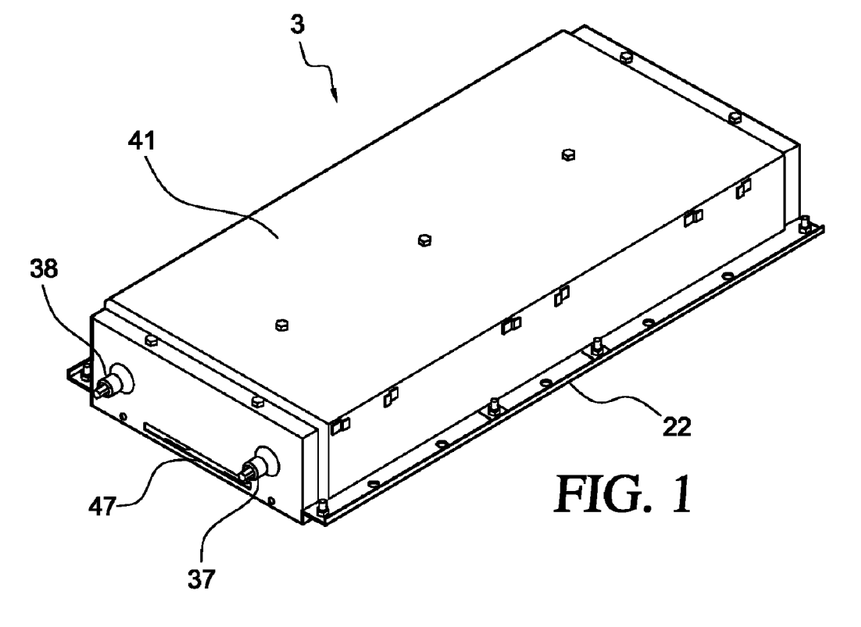
FIG. 1 is an appearance perspective view of a battery module according to a first embodiment to which the present invention can be applied.

As shown in FIG. 1, a battery module 3 of this embodiment is provided with an exterior case formed in an approximately hexahedral or cubic shape made from metal and composed of an upper lid 41 and a lower lid 22. A plurality of assembled battery units 2, each being composed of unit cells, are accommodated and fixed in the exterior case (see FIG. 11).

<Assembled Battery Unit>

Figure 2:
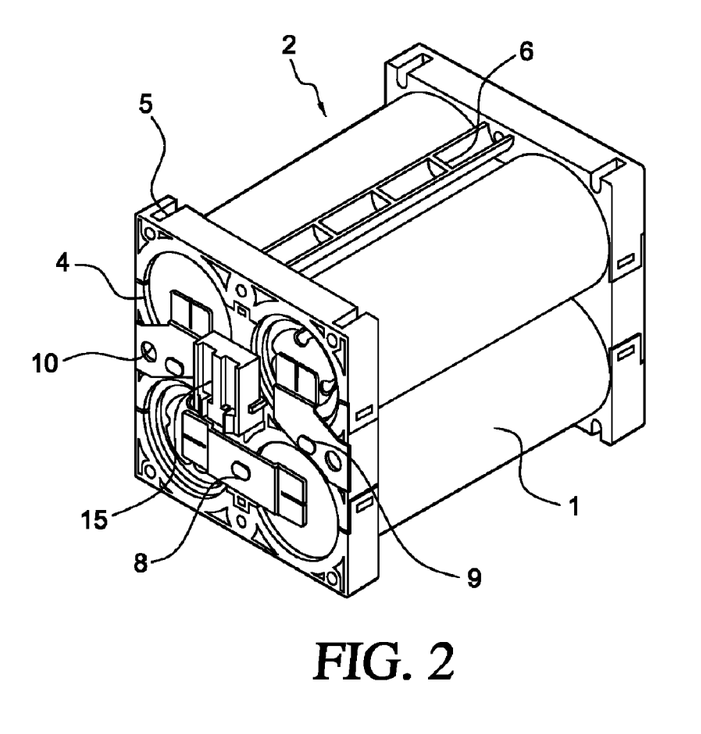
FIG. 2 is an appearance perspective view of an assembled battery unit used in the battery module according to the first embodiment.
Figure 3:
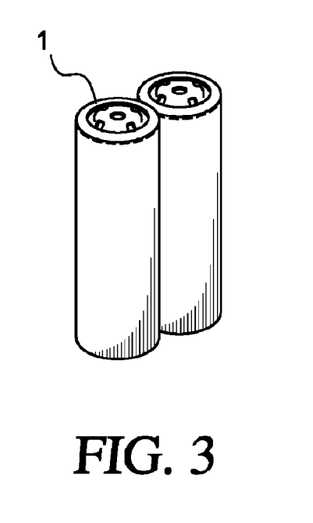
FIG. 3 is an appearance perspective view of a cylindrical unit cell constituting the assembled battery unit.

In the assembled battery unit 2, as shown in FIG. 2, four unit cells 4 are arranged in two rows and two columns such that their polarities become alternate and they are connected in series. There are various shapes of unit cells, but a cylindrical lithium secondary cell formed by covering a main constituent material (active material) such as lithium manganese with a casing with high heat conductivity is used in this embodiment, as shown in FIG. 3.

As shown in FIG. 2, the assembled battery unit 2 is constituted such that unit cells 1 are sandwiched from a vertical direction to their circumferential directions by an intermediate frame holder 4 and outer frame holders 5 which are resin-molded products, and the four unit cells 1 are electrically connected by a metal bus bar in series by welding. Voltage detecting wires 15 for detecting voltages 1 of individual unit cells 1 are connected to the assembled battery unit 2 in advance. The bus bars and the voltage detecting wires 15 which are electric parts are collected and fixed on the intermediate frame holder 4. In order to improve workability, the metal bus bars and the voltage detecting wires are connected in advance prior to assembling the assembled battery unit 2. The two outer frame holders 5 with the same shape are arranged above and below the intermediate frame 4 so as to oppose each other, where a snap-fit structure where the intermediate frame 4 and the two outer frame holders 5 are fitted to each other at a plurality of portions (six portions) is adopted.

The outer frame holder 5 has two unit cell holding portions which abuts on end face peripheral faces of unit cells 1 and an arch-shaped louver 6 having an approximate U-shape in section that defines distance between the unit cell holding portions and allows flow of cooling air to peripheral faces of the unit cells 1. On the other hand, the intermediate frame holder 4 has two unit cell holding portions which abut on end portion peripheral faces of unit cells 1 from the opposite side of the outer frame holder 5 and a louver 7 with a cross shape in section that defines distance between the unit cell holding portions and allows flow of cooling air to peripheral faces of the unit cells 1 (see FIG. 12). Lead wire portions of the voltage detecting wires 15 are fixed to the cross-shaped louver 7 along a longitudinal direction of the cross-shaped louver 7. Fixing holes (female screw portions) for fixing an assembled battery unit 2 with screws are formed in the unit cell holding portions of the outer frame holder 5.

The metal bus bars collected on the intermediate frame holder 4 include an inter-unit cell bus bar 8 for connecting unit cells 1, a positive electrode bus bar 9 for positive electrode output, and a negative electrode bus bar 10 for negative electrode output, and nuts for screw fastening are inserted into resin in the positive electrode bus bar 9 and the negative electrode bus bar 10. The metal bus bar may be made from metal with low electric resistance because it is basically required to only allow electric connection. In the embodiment, however, since the unit cell 1 and the metal bus bar are connected through resistive welding, material obtained by plating nickel to copper is used for the metal bus bar.

<Assembled Battery Block>

Figure 4:
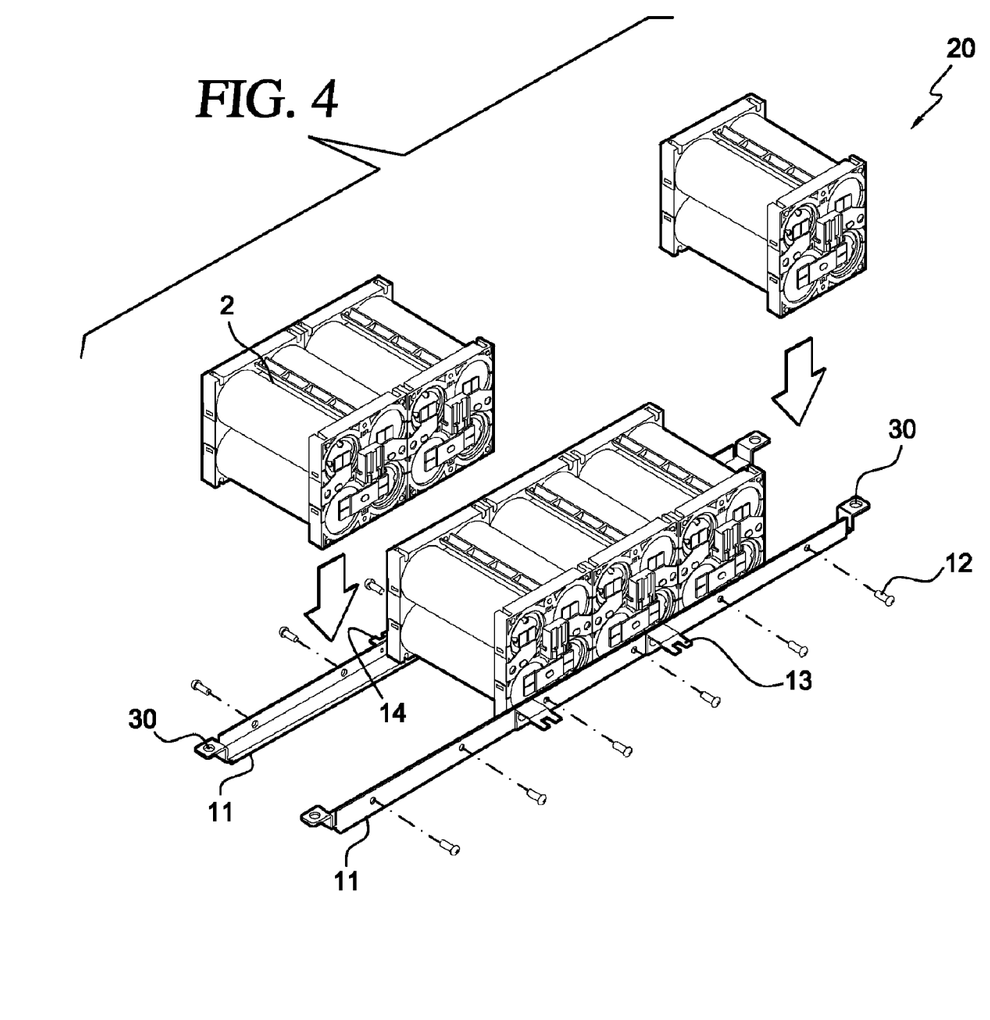
FIG. 4 is a perspective view showing an assembled state of an assembled battery block obtained by collecting assembled battery units.
Figure 7:
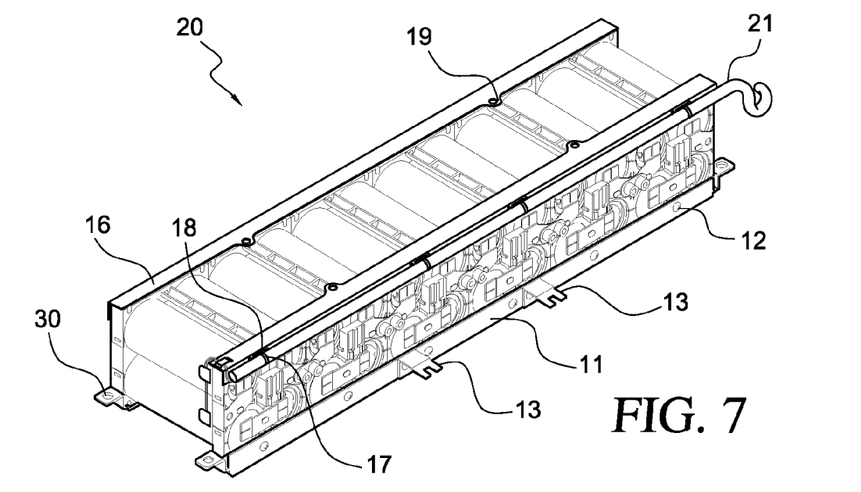
FIG. 7 is an appearance perspective view of the assembled battery cell.

In the embodiment, as shown in FIG. 4 and FIG. 7, six assembled battery units 2 are disposed on two channel-shaped block bases 11 with an approximate L shape in section serving as frames and disposed to be opposed to each other, they are fixed by tapping screws 12 screwed in the fixing holes (female screws) described above, and an assembled battery block 20 is assembled as a group of assembled batteries connected series assembled by inter-assembled battery bus bars connecting the negative bus bars 10 and the positive bus bars 9 of adjacent assembled battery units 2 in order to improved assembling easiness and handling easiness of the battery module 3.

In the block base 11, the maximum stress generated when load is applied to a face of the block base 11 on which assembled battery units 2 are disposed varies according to a sectional shape and material of the back base 11. Different points due to the sectional shape and material for the block base 11 for arranging and fixing the assembled battery units 2 are shown in FIGS. 5A to 5E and the following tables.

TABLE 1

Figure 5A:
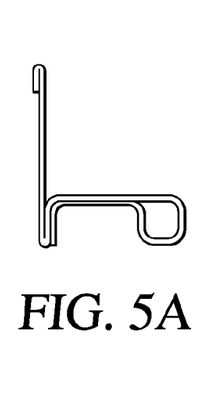
FIGS. 5A to 5E are sectional views of block bases which can be used in the assembled battery block, FIGS. 5A to 5D being sectional views of block bases obtained by an iron-plate bending work and FIG. 5E being a sectional view of a block base obtained by extrusion molding of aluminum.
Figure 5B:
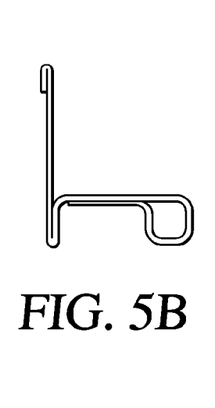
Figure 5C:
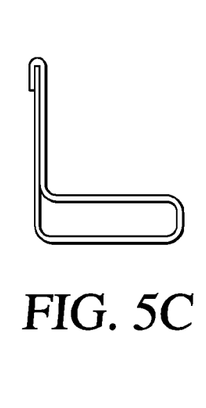
Figure 5D:
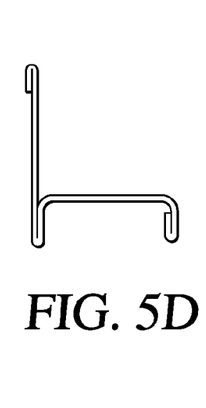
Figure 5E:
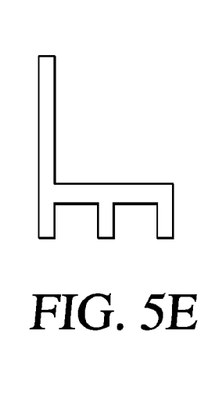

| | SHAPE | | | | |
|---|---|---|---|---|---|
| | FIG. 5A | FIG. 5B | FIG. 5C | FIG. 5D | FIG. 5E |
| MATERIAL | Fe (iron plate bending work) | | | | Al (extrusion) |
| WEIGHT RATIO | 1.8 | 1.7 | 1.8 | 1.3 | 1 |
| MAXIMUM STRESS RATIO | 2.5 | 3.4 | 3.5 | 3.7 | 1 |

Block bases shown in FIGS. 5A to 5D are produced by iron bending work, while a block base shown in FIG. 5E is produced by extrusion molding. It is found that each of the block bases made from iron plate shown in FIGS. 5A to 5D is heavier in weight than the block base made from aluminum show in FIG. 5E by 1.5 times and the former block base is larger in stress generated than the latter block base. In general, since iron has strength higher than that of the aluminum, it is thought that a block base produced by bending a thin iron plate is lighter and stronger than a block base made from aluminum. However, it has been found that a block base produced by extruding a slightly thicker aluminum is effective in view between the weight ratio and the maximum stress ratio. In the embodiment, the block base with an approximate L shape in section made from aluminum and shown in FIG. 5E is used from such an examination result.

As shown in FIG. 4, the block bases 11 each have a plurality of flange portions extending laterally for fixing the assembled battery block 20 to the lower lid 22 laterally. There are two kinds of flanges, where the block base 11 disposed on an outboard side is referred to as block flanges A 13, while the block base 11 disposed on an inboard side is referred to as block flanges B 14. In other words, when a face positioned outside the battery module 3 is defined as a face on which the voltage detecting wires 15 of the assembled battery unit 2 have been fixed, the block flanges A 13 are disposed on the block base 11 having this face. The block flanges A 13 are sandwiched between the lower lid 22 and the upper lid 41 and the block base 11 is also fastened and fixed simultaneously with fastening of the lower lid 22 and the upper lid 41 (see FIG. 11). Block base circular holes 30 for fixing the assembled battery block 20 from a front face side and a rear face side are formed in both ends of the block base 11.

Figure 6:
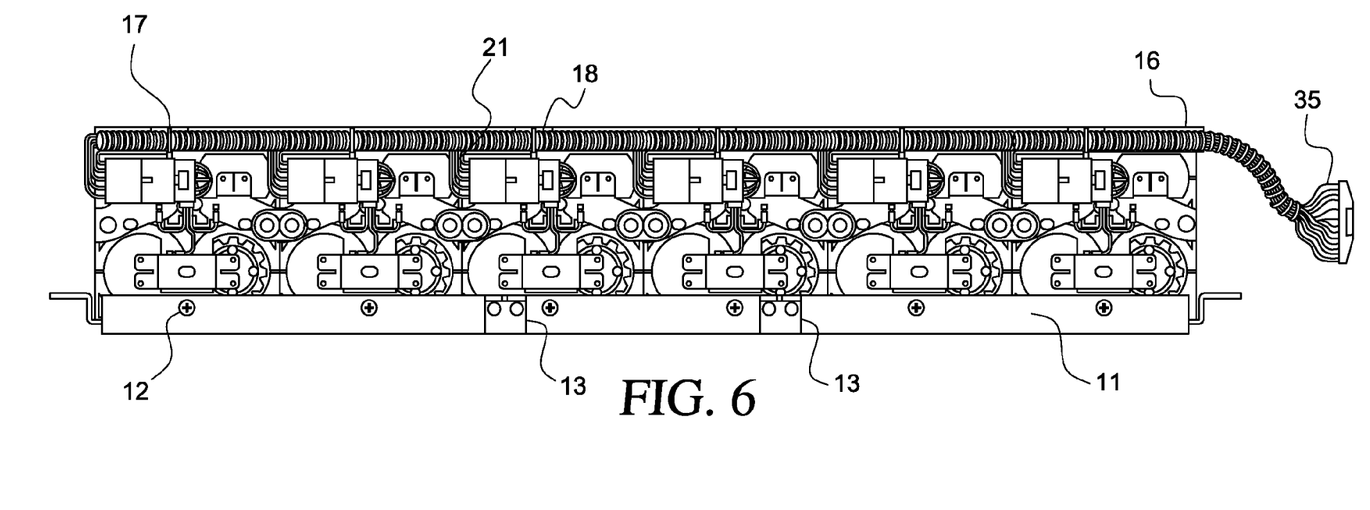
FIG. 6 is a side view of the assembled battery block.

As shown in FIG. 6 and FIG. 7, channel-shaped block reinforcing plates 16 with an approximate L shape in section are arranged above the assembled battery block 20 in parallel with the bock bases 11. The assembled battery unit 2 is fixed to the block reinforcing plates 16 by tapping screws laterally. A voltage detecting harness 21 connected to the voltage detecting wires of the respective assembled battery units 2 constituting the assembled battery block 20 is fixed to the block reinforcing plate 16 on the face side that the voltage detecting wires 15 are fixed. That is, a cable tie 18 for attaching a banding band 17 is attached to the block reinforcing plate 16 by a tapping screw 12. The block reinforcing plate 16 is curved at two portions to have two block reinforcing portion curved portions 19 with a circular hole. Handling of the assembled battery block 20 such as carrying is conducted by inserting hooks made of a thick wire into the circular holes. Incidentally, a cable tie 18 can not be attached to the reinforcing portion curved portion 19 in view of a specification required for strength.

<Battery Module>

Figure 8:
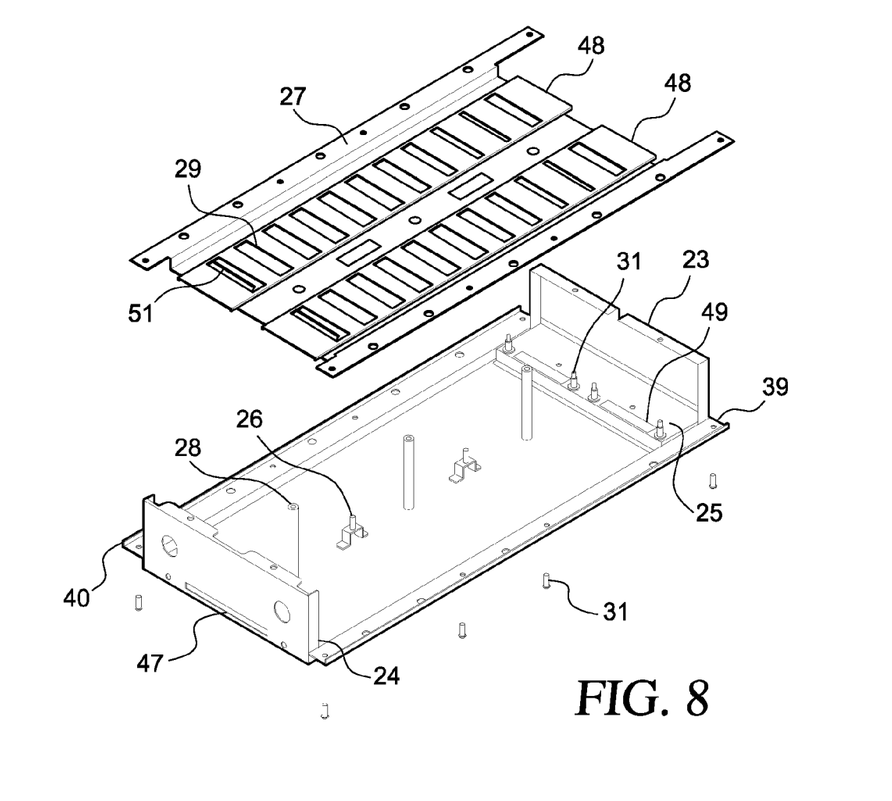
FIG. 8 is a partially exploded perspective view of parts constituting a lower lid.

As shown in FIG. 8, the lower lid 22 is composed of six kinds of parts of a lower lid base 23, an introduction side fixing stand 24, a discharge side fixing stand 25, block fixing stands 26, a reinforcing louver 27, and center poles 28.

The lower lid base 23 constitutes a front face, a bottom face, and a rear face. A front face portion of the lower lid base 23 are formed at its central and both sides with a circular hole for taking out a positive electrode power cable 37 serving as a positive electrode output cable and a hole for taking out a negative electrode power cable 38 serving as a negative electrode output cable (see FIG. 1), and is formed at its lower portion with a cooling air introduction gate 47 serving as a slit-like ventilation port. An upper face side and left and right side face side end portions of the front face portion of the lower lid base 23 are bent in an L shape. On the other hand, a rear face portion of the lower lid base 23 is formed with a cooling air discharge gate 50 serving as a slit-like ventilation port for discharging cooling air on a portion thereof at a position corresponding to the cooling air introduction gate 47 formed at the front face portion (see FIG. 9). Lower lid flange portions 39 with an approximately horizontal face serving as first flange portions extend from a bottom face portion of the lower lid base 23 toward left and right lateral directions so as to position above the bottom face of the lower lid base 23. A bent rib 40 bend upwardly is formed on each of an end portion of the lower lid flange portions 39.

Figure 9:
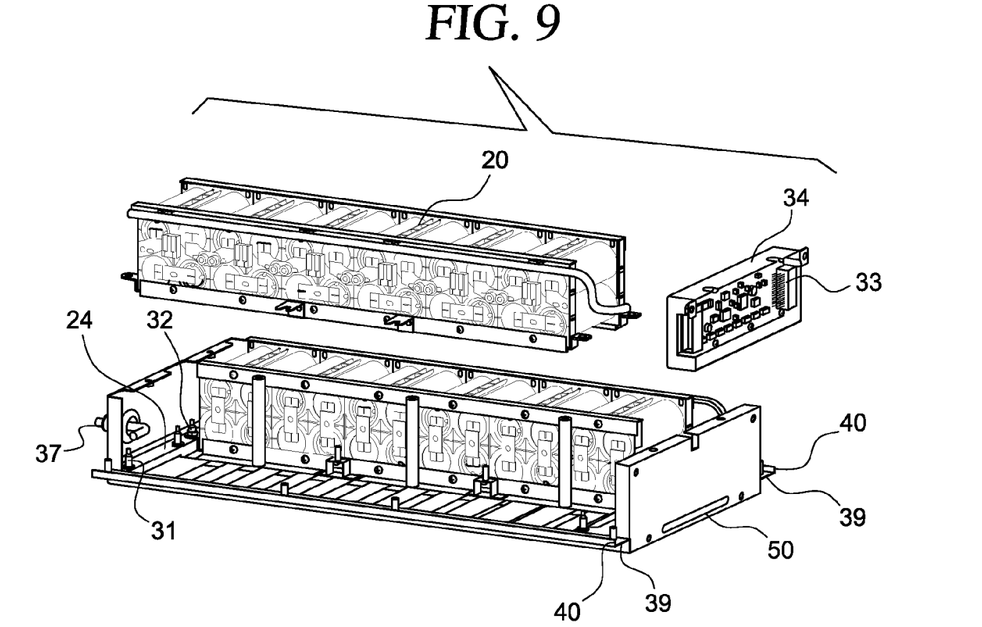
FIG. 9 is a perspective view showing a state that the assembled battery block has been assembled to the lower lid.
Figure 11:
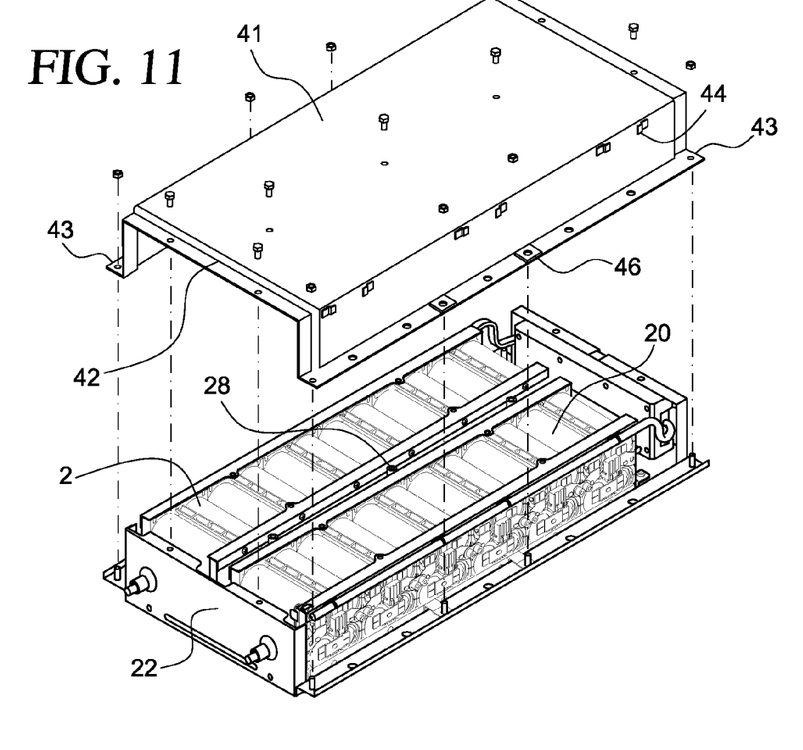
FIG. 11 is a perspective view showing an assembled state of an upper lid.
Figure 12:
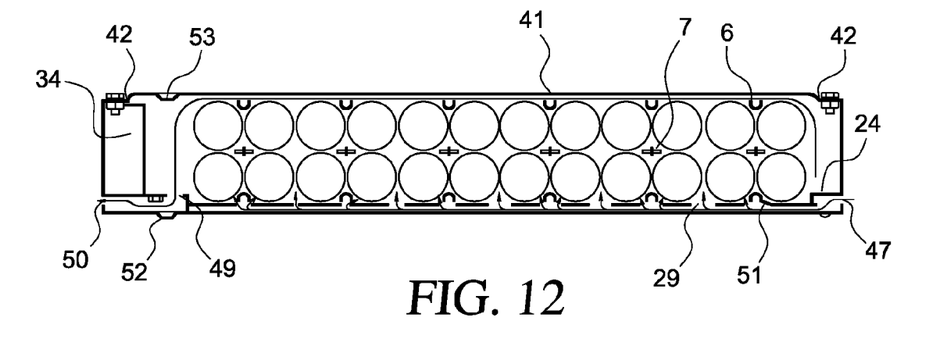
FIG. 12 is a schematic sectional view of a battery module illustratively showing flow passage of cooling air.

The introduction side fixing stand 24 for fixing the block bases 11 of the assembled battery block 20 from the front side and guiding cooling air introduced from the cooling air introduction gate 47 to the reinforcing louver 27 is fixed to the bottom portion of the lower lid base 23 on the front face side (also see FIG. 9 and FIG. 12). On other hand, the discharge side fixing stand 25 for fixing the block bases 11 of the assembled battery block 20 from the rear side and guiding cooling air which has passed through the battery module 3 to the cooling air discharging gate 50 via two discharge ports 49 formed in an upper face thereof is fixed to the bottom face portion of the lower lid base 23 on the rear face portion side (also see FIG. 12). The center poles 28 (also see FIG. 11) for supporting a central portion of the upper lid 41 in the longitudinal direction and for coupling (screw-fastening) to the upper lid 41 and the block fixing stands 26 for fixing the block flanges B 14 of the block base 11 of the assembled battery block 20 are alternately fixed at a central portion of the bottom base portion along the longitudinal direction of the bottom face portion of the lower lid base 23.

The reinforcing louver 27 for reinforcing bottom face strength of the lower lid base 23 and supplying cooling air for each assembled battery block 20 is fixed on the lower lid base 23. The center of the reinforcing louver 27 in a longitudinal direction thereof abuts on the bottom face portion of the lower lid base 23 and it is formed with circular holes and rectangular holes which allow insertions of the center poles 28 and the block fixing stands 26 fixed on the lower lid base 23. Both sides of the center of the reinforcing louver 27 in the longitudinal direction are made high in a stepped manner (hereinafter, called "a duct formation portion"), so that ducts 48 serving as cooling ducts with a rectangular opening section are formed in cooperation with the lower lid base 23. Rectangular ventilation ports 29 are formed in the duct formation portion at portions corresponding to between respective adjacent unit cells 1 (also see FIG. 12). About one half of an opening area of the ventilation port nearest the cooling air introduction gate 47 is covered with a rib-like shielding louver 51.

Both lateral sides of the duct formation portion of the reinforcing louver 27 abut on the bottom face portion of the lower lid base 23 like the central portion in the longitudinal direction. Both lateral side portions of the reinforcing louver 27 are erected and flange portions with an approximately horizontal face extend therefrom laterally toward the left and the right directions. The flange portions of the reinforcing louver 27 are caused to plane-contact with the lower lid flange portions 39 of the lower lid base 23 to be fixed thereto. The reinforcing louver 27 is notched at the front face and rear face sides so as to avoid positions of the introduction side fixing stand 24 and the discharge side fixing stand 25 fixed to the lower lid base 23. Incidentally, an end portion of the duct formation portion of the reinforcing louver 27 on the side of the introduction side fixing stand 24 is inserted in the introduction side fixing stand 24 so as to communicate with the cooling air introduction gate 47 (also see FIG. 9 and FIG. 12).

Figure 10:
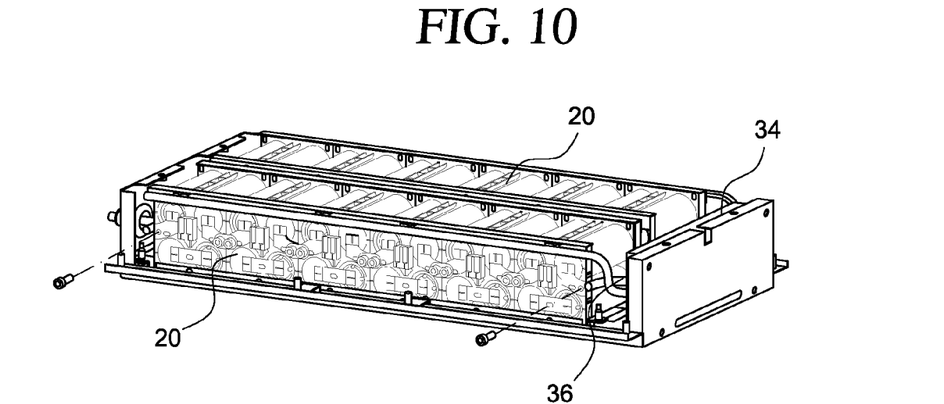
FIG. 10 is a perspective view showing a state that the assembled battery block has been assembled to the lower lid and a block cable has been attached to the assembled battery block.

As shown in FIG. 9 and FIG. 10, two assembled battery blocks 20 are fixed in parallel on the lower lid 22. That is, stud bolts 31 provided on the induction side fixing stand 24 and the discharge side fixing stand 25 in a standing manner are inserted into the block base circular holes 30 of the block bases 11 of the each assembled battery block 20 at both the ends and the bolts are fixed by spring-assembled nuts 32. The block flanges B 14 of the block bases 11 of the assembled battery blocks 20 are fixed on the block fixing stands 26 by spring-assembled nuts 32 so as to be superimposed with each other.

A cell controller (C/C) box 34 attached with a cell controller (C/C) 33 is screw-fixed to the lower lid base 32 on on the discharge side fixing stand 25. The cell controller 33 has a connector on a base board, and a voltage harness connector 35 (see FIG. 6) attached to one side of the voltage detecting harness 21 is connected to the connector of the cell controller 33.

The assembled battery blocks fixed on the lower lid 22 in parallel are connected in series by a block cable 36. Grommets are fixed to the circular holes I the front face portion of the lower lid base 23 and the positive electrode power cable 37 and the negative electrode power cable 38 are derived from the grommets (see FIG. 1).

As shown in FIG. 11, the upper lid 41 constitutes a left side face, an upper face, and a right side face of the interior case. The upper lid 41 has a characteristic shape, where upper lid drawn portions 42 formed by drawing front face and rear face sides are provided. In other words, both end portions of the left side face, the upper face, and the right face side are bent toward the front face portion and the rear face portion of the lower lid base 23 to be narrowed in order to increase bearing force of the whole exterior case against a twisting direction. Collar guides 44 for restricting movement of a collar 45 (see FIG. 14) described later are welded on the left and right side faces of the upper lid 41. Upper lid flange portions 53 with an approximately horizontal face serving as second flange portions extend from left and right sides of the upper lid 41. Flange portion recesses 46 are formed on the upper flange portions 43 such that they avoid the block flanges A 13 extending from the block base 11 that have ridden on the lower lid flange portion 39.

The lower lid flange portions 39 and the upper lid flange portions 43 are screw-fastened to each other by stud bolts 31 (see FIG. 8). The upper lid drawn portions 42, and the front face portion and the rear face portion of the lower lid base 23 are screw-fastened. Since a step portion is formed between the upper face of the upper lid 41 and the upper lid drawn portion 42, screw heads fastened do not project above the upper face of the upper lid 42 (also see FIG. 12). Female screws are formed on top portions of the center poles 28 provided on the lower lid base 23 in a standing manner, so that the upper lid 41 and the lower lid 22 are also screw-fastened to each other at these portions.

<Cooling System>

As shown in FIG. 12, the battery module 3 adopts a forcible cooling system for forcibly cooling respective unit cells 1 using cooling air. That is, the cooling system for the battery module 3 has a structure that cooling air introduced from the cooling air introduction gate 47 passes through inside of the introduction side fixing stand 24 of the lower lid 22, flows through ducts formed between the reinforcing louver 27 and the lower lid base 23 and corresponding to respective assembled battery blocks 20 to pass through respective ventilation holes 29 formed in (the duct formation portion of) the reinforcing louver 27, reaches a space formed between the unit cells 1 and the upper lid 1 while turning around the peripheries of the unit cells 1, and passes through below the C/C box 34 via the discharge port 49 formed on the upper face of the discharge side fixing stand 25 to flow to the outside.

The arch-shaped louvers 6 and the cross-shaped louvers 7 have functions serving as columns for the intermediate frame holder 4 and the outer frame holders 5 and have functions serving as louvers. Here, the most important point lies in positions and opening areas of the ventilation holes 29 formed in the reinforcing louver 27. Such a point is important that the shielding louver 51 is provided to the ventilation hole 29 nearest the air introduction side, the opening areas of the ventilation holes 29 are reduced according to separation from the air introduction side, and the size of the ventilation hole 29 nearest the air discharge side is made large.

FIGS. 13A to 13D show deviations (dispersion of a surface temperature) from an average value of surface temperatures of all the unit cells 1 when the assembled battery module 2 has been discharged under conditions of a wind velocity of cooling air of 15 m/s and an environmental temperature of 40 centi-degrees. The numbers on the horizontal axis indicate the positions of the unit cells 2 from the discharge side and black squares indicate surface temperatures of the unit cells in the first stage, and while circles indicate surface temperatures of the unit cells in the second stage.

Figure 13A:
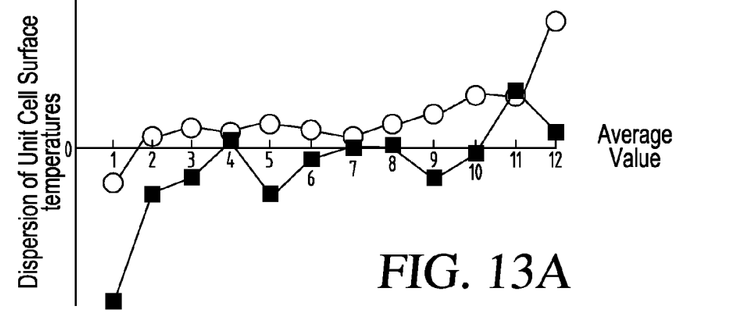
Figure 13B:
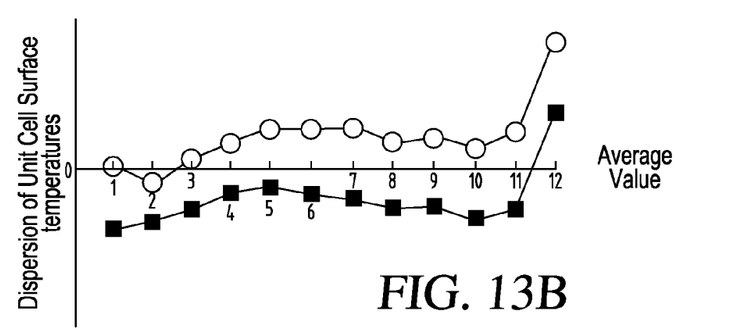

FIG. 13A shows variations of surface temperatures of unit cells when ventilation holes 29 with the same opening area between respective adjacent unit cells 1 are formed. When only the ventilation holes with the same opening area are disposed simply, large variations occur. Since the surface temperatures are largely fluctuated vertically in the unit cells in the first stage, it is thought that an abnormal flow occurs. FIG. 13B shows variations of surface temperatures of the unit cells when the opening areas of the ventilation holes 29 are reduced rearward of the duct 48 (toward the discharge side fixing stand 25). It is found that a relatively stable flow can be obtained as compared with the flow in the case shown in FIG. 13A. However, the surface temperatures of the unit cells near the introduction side are abnormally high in the case shown in FIG. 13B, which is thought due to staying of cooling air at that portion.

Figure 13C:
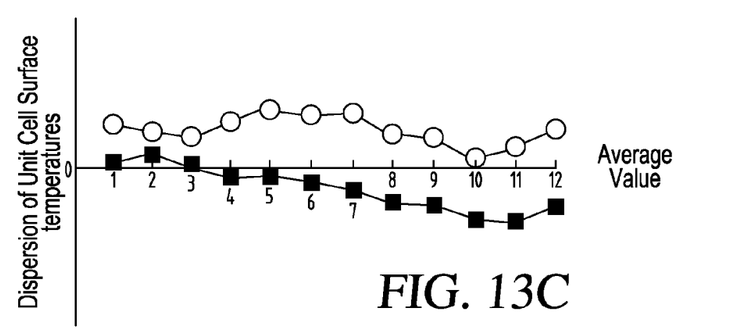

FIG. 13C shows variations of surface temperatures of the unit cells when a shielding louver 51 which shields the ventilation hole 29 nearest the introduction side obliquely is formed while the opening areas of the ventilation holes 29 shown in FIG. 13B are maintained. Since it is thought that a vortex flow occurs due to hit between cooling air flowed in from the below the first stage of the unit cell nearest the introduction side and a cooling air directed in a lateral direction by the cross-shaped louver 7 o the intermediate frame holder 4 of the assembled battery unit 2, the shielding louver 51 is provided for preventing inflow of cooling air from the below. As a result, an abnormal deviation of the surface temperature of the unit cell nearest the induction side was reduced, but the surface temperature of the unit cell nearest the discharge side was increased. The flow of cooling air is complicated and partial change of flow of cooling air causes another desirable flow like whack-a-mole game.

Figure 13D:
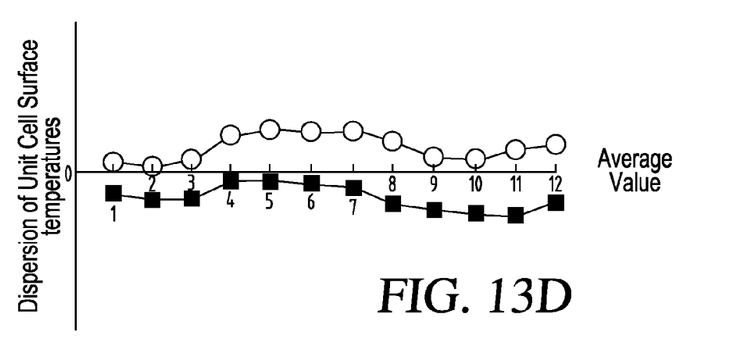

Since cooling air which has heat-exchanged by forcible cooling is concentrated at the discharge side, a satisfactory result can not be achieved by only reducing the opening areas of the ventilation holes 29 to increase a flow rate but a larger effect can be obtained by exposing the unit cells to a large amount of cooling air with reduced temperature. As the keen examination, the present inventor(s) has (have) found that, when the ratio of the opening area of the ventilation hole 29 at the central portion is defined as 1.0, the ratios of the opening areas are set to 0.7, 0.25, 0.4, 0.7, 0.8, 1.0, 1.0, 1.0, 1.0, and 0.65 from the discharge side, so that an optimal cooling system can be obtained. FIG. 13D shows variations of the surface temperatures of the unit cells when the above ratios of the opening areas are adopted. In this embodiment, by forming the ventilation holes 29 with the opening areas set in the above ratios in the duct formation portion of the reinforcing louver 27, a stable cooling performance can be obtained and louvers formed in a simple shape and having the same shape can be used in the assembled battery unit 2 without requiring complicated louvers, so that an effective cooling system can be obtained at a considerably low cost.

<Assembling Procedure>

Next, an assembling procedure of the battery module 3 according to the embodiment will be explained in the order of the assembled battery unit 2, the assembled battery block 20, and the battery module 3.

<Assembling Procedure of Assembled Battery Unit 2>

Adhesive is applied to the curved portions of the outer frame holders 5 contacting with the unit cells 1, unit cells 1 are disposed on the outer frame holders 5 that their polarities are alternate, and the intermediate frame holders 4 with the curved portions applied with adhesive are covered on the unit cells 1. Since there are six snap-fitting coupling portions between the outer frame holders 5 and the intermediate frame holders 4, it is necessary to press the outer frame holders 5 and the intermediate frame holders 4 against each other with a certain force. Next, unit cells 1 are disposed on opened curved portions of the intermediate frame holders 4 while attention is paid to polarities of the unit cells 1, and other outer frames 5 are covered on the unit cells 1. The metal bus bars and the respective unit cells 1 are connected by resistive welding. Final fixation of the unit cells 1, two outer frame holders 5, and the intermediate holder 4 depends on adhesive, but a structure that fixation of the unit cells 1, two outer frame holders 5, and the intermediate holder 4 can be maintained sufficiently by physical binding force based upon the snap-fitting until the adhesive is dried and solidified is adopted. Therefore, since the assembling procedure can be transferred from the adhering step to respective steps of welding, inspecting, and assembling without requiring extra drying time, efficiency per time is high.

<Assembling procedure of Assembled Battery Block 20>

The assembled battery units 2 thus manufactured are fixed on two block bases 11 (see FIG. 5E) disposed in parallel to face each other by tapping screws 12. As shown in FIGS. 6 and 7, after the assembled battery units 2 are fixed to the block bases 11, the block reinforcing plates 16 are arranged on the assembled battery units 2, and they are fixed by tapping screws 12 like the case of the block bases 11. At this time, cable ties 18 for attaching the banding bands 17 are attached at four portions on the face on which the voltage detecting wires 15 have been disposed by the tapping screws 12. Thereafter, the voltage detecting harness 21 is disposed in the vicinity of the cable tie 19 and it is fixed to the assembled battery block 20 by the banding bands 12.

<Assembling Procedure of Battery Module 3>

As shown in FIG. 9, the assembled battery blocks 20 are arranged and fixed on the lower lid 22. At this time, handling of the assembled battery block 20 such as carrying thereof is performed by inserting hooks made of a thick wire into the circular holes of the block reinforcing plate curved portions 19 of the block reinforcing plates 16. The assembled battery block 20 is fixed by inserting the stud bolts 31 of the introduction side fixing stand 24 and the discharge side fixing stand 25 constituting the lower lid 22 into the block base circular holes 30 formed at both ends of the block bases 11 of the assembled battery block 20 and fastening the nuts 32 to the stud bolts 31. After two assembled battery blocks 20 are fixed in parallel, it is confirmed that the block flanges B 14 extending from the block bases 11 of the assembled battery blocks 20 are superimposed on the block fixing stand 26 and the block bases 11 are fastened by the spring-assembled nuts 32.

After fastening of the assembled blocks 20 is terminated, the C/C box 34 is inserted between the assembled battery blocks 20 on the discharge side fixing stand 25 of the lower lid 22 and the lower lid 22, and the voltage detecting harness connector 35 (see FIG. 6) and the connector in the C/C box 34 are connected to each other. Thereafter, the C/C box 34 is slid to the wall side of the back face of the lower lid 22 to be pressed thereto, and it is fastened by screws from the outside of the module 3. The C/C box 34 is fixed at four fixing points, that is, the fixation is performed by lateral fixations from the back face of the lower lid 22 and upward fixations to welding nut portions provided on the discharge side fixing stand 25. A play or clearance corresponding to an insertion stroke of the connector is required on the side of the voltage detecting harness in order to fasten the connectors to each other, but adopting such a constitution results in excessive elongation of the harness. A required play can be suppressed to the minimum by connecting the connectors in a free stage where the C/C box 34 is not fixed yet like the embodiment.

As shown in FIG. 10, block cables 36 for conducting electric connection between the assembled battery blocks 20 are fastened by mounting screws, and the positive electrode power cable 37 with a grommet and the negative electrode power cable 38 with a grommet fixed to the lower lid 22 in advance are connected to the respective assembled battery blocks 20 and fastened thereto using screws. Since crimping terminals are connected to terminal ends of the power cables, attaching of the power cables can be performed simply.

As shown in FIG. 11, after all the electric connections have been completed, the upper lid 41 is placed on the lower lid 22 and the lower lid 22 and the upper lid 41 are fastened (combined) by individual screws. That is, the stud bolt 31 provided on the lower lid flange portions 39 of the lower lid 22 in a standing manner and the circular holes formed in the upper lid flange portion 43 of the upper lid 41 are fastened by screws. At this time, the block flanges A 13 extending form the block base 11 are put on the lower lid flange portion 39, the upper lid 41 and the lower lid 22 are fastened on the flange portion recesses 46, and the assembled battery block is also fastened. Assembling of the battery module 3 is completed by screw-fastening the lower lid 22 at the upper lid drawn portions 42 and screw-fastening the upper face of the upper lid 41 and he center poles 28.

Second Embodiment

Next, a second embodiment where the present invention is applied to a battery power source apparatus for an electric vehicle or a motor vehicle will be explained. The battery power source apparatus according to the present invention is constituted by stacking two battery modules. In the present embodiment, same members as those in the first embodiment are attached with same reference numerals in the first embodiment and explanation thereof is omitted. Only portions in the present embodiment different from the first embodiment will be explained in the following.

Figure 14:
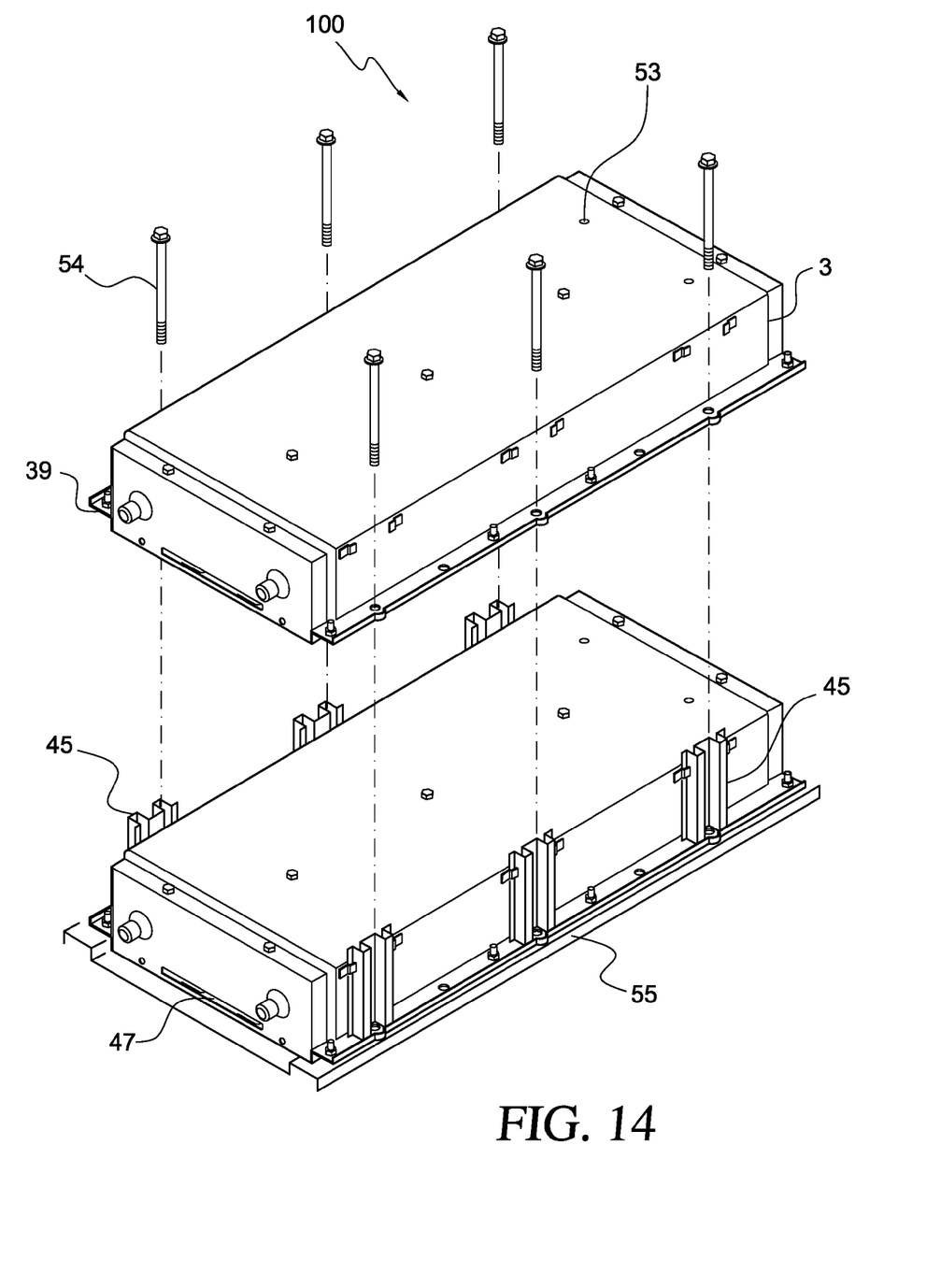
FIG. 14 is a perspective view showing an assembled state of a battery power source apparatus according to a second embodiment to which the present invention can be applied.
Figure 15:
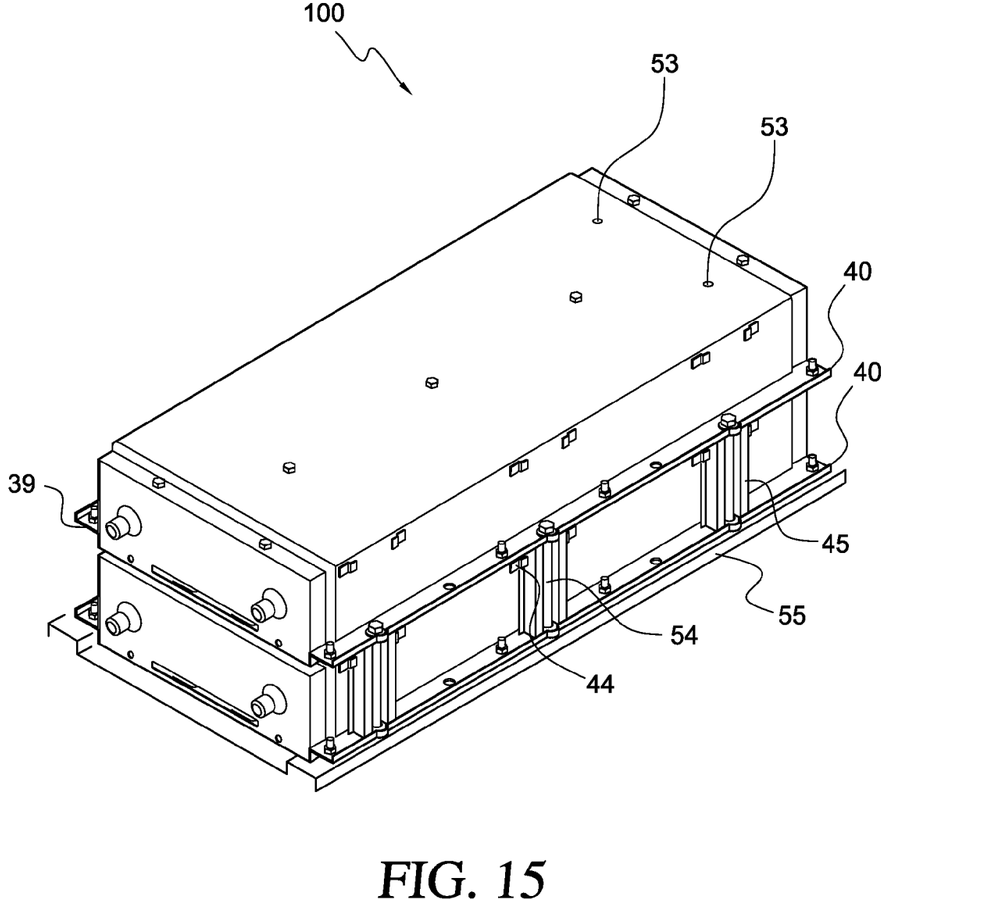
FIG. 15 is an appearance perspective view of the battery power source apparatus according to the second embodiment.

As shown in FIG. 14 and FIG. 15, a battery power source apparatus 100 according to the embodiment has a base stand 55 on which the battery module 3 is mounted. Since the lower lid flange portions 39 are positioned above the bottom face of the lower lid 22, arrangement and fixation on the mounting side (a vehicle side) can be performed easily. If stud bolts or welded nuts are mounted on flanges on the mounting side, an assembling work is easily conducted, of course. Welded nuts are attached on the base stand 55 and screw-fastening is performed after arranging the battery module 3. Thereafter, approximately slender collars 45 are inserted in the collar guides 55 (engagement portions) to be engaged therewith, and the second stage battery module is disposed. At this time, the collars 45 contact with the lower lid flange portions 39 of the second stage battery module 3, and positioning of the second stage battery module 3 is achieved by lower lid projections 52 (see FIG. 12) formed on the lower lid 22 and upper lid recesses 53 formed on the upper lid 41. The lower lid projection 52 and the upper lid recess 53 are each formed in a truncated cone shape, and they are positioned on two rear portions of the battery module 3. The second battery module 3 is disposed such that the lower lid projections 52 matches with the upper lid recesses 53, and long bolts 54 are inserted into the circular holes attached with the collars 45 so that the second stage battery module 3 is fixed. That is, the first stage battery module 3 is directly fixed on the base stand 55 by four bolts, and the second stage battery module 3 is fixed via the collars 45 by six bolts.

By forming the upper lid recesses 53 on the upper lid 41 and forming the lower lid projections 52 on the lower lid 22, stacking arrangement of the battery modules 3 is made possible and a utilization rate of a space is improved since the battery modules can be arranged in a three-dimensional manner as compared with a two-dimensional arrangement. At this time, it is important that strength of the upper lid 41 of the first stage battery module 3 is increased preliminarily. In this embodiment, the bent rib 40 bent from the lower lid flange portion 39 upwardly is curved in a waveform shape, so that stress applied from the collars 45 is distributed by the waveform shape portions. In order to facilitate positioning of the lower lid 22 and the upper lid 41 to each other at a coupling time thereof, the end portion of the upper lid flange portion 43 has a shape corresponding to the shape of the bent rib 40 of the lower lid flange portion 39 (the waveform shape). Incidentally, when the strength of the upper lid 41 is increased to a certain extent, a sufficient function can be obtained even by the simple upwardly bent rib 40 illustrated in the first embodiment.

(Operation and the Like)

Next, operations of the battery module 3 and the battery power source apparatus 100 according to the first and second embodiments and the like will be explained.

In the battery module 3 according to the first embodiment, the exterior case includes the lower lid 22 having three faces of the front face, the bottom face, and the rear face and the upper lid 41 having three faces of the left side face, the upper face, and the right side face, and it is formed in an approximate hexahedron by coupling the lower lid 22 and the upper lid 41. Therefore, when two assembled battery blocks 20, each being composed of six assembled battery units 2, are arranged and fixed on the lower lid 22, since the left side face and the right side face are opened, workability (assembling easiness) can be improved. When the lower lid 22 and the upper lid 41 are coupled to each other, visual confirmation can be performed from the front face and rear face directions, safety can be improved. Since each of the upper lid 41 and the lower lid 22 has three faces, manufacturing cost of the exterior case according to the embodiment can be reduced as compared with the conventional exterior case having a box structure with five faces.

In the battery module 3 according to the embodiment, since the circular holes for taking out the positive electrode power cable 37 and the negative electrode power cable 38 are formed in the front face of the exterior case (the lower lid base 23) and the positive electrode power cable 37 and the negative electrode power cable 38 are fixed to the lower lid 22 before the assembled block 20 is accommodated and fixed, erroneous wire connection can be prevented and safe electric connection can be performed. Since the cooling air introduction gate 50 and the cooling air discharging gate 49 are respectively formed in the front face and the rear face of the exterior case (the lower lid base 23) and the duct formation portion is formed on the reinforcing louver 27, formation of the cooling system is completed by arranging and fixing the assembled blocks 20 on the lower lid 22 and connecting the upper lid 44 to the lower lid 22, so that assembling easiness can be improved.

In the battery module 3 according to the above-described embodiment, since the lower lid 22 and the upper lid 41 are fixed to each other such that the lower lid flange portions 39 extending from the bottom face portion of the lower lid 22 toward the both lateral sides correspond to the upper lid flange portions 43 extending from the left and right side faces of the upper lid 41 toward the both lateral sides, positioning of the upper lid 41 and the lower lid 22 can be made easily by the lower lid flange portions 39 and the upper lid flange portions 43, so that workability is improved and, since a flat face (an approximately horizontal face) is formed by the lower lid flange portions 39 and the upper lid flange portions 43, screw-fastening is made easy.

In the battery module 3 according to the above embodiment, since the lower lid flange portions 43 are positioned above he bottom face of the lower lid 22, the coupling portion of the lower lid flange portions 39 and the upper lid flange portions 43 is floated from the placement face of the exterior case, and the lower lid flange portions 43 do not contact with the placement face of the exterior case, breaking of the coupling portion due to vibrations or the like is prevented so that reliability of the coupling portion is improved. Since the bent rib 40 bent upwardly is formed at the end portion of the lower lid flange portion 39, an amount of material to be used can be reduced by reducing the plate thickness of the lower lid base 23, so that the weight and the cost of the lower lid 22 can b be lowered, and since the bent rib 40 is bent upwardly, positioning conducted when the lower lid 22 and the upper lid 41 are coupled to each other is made easy so that workability is improved. In the second embodiment, since the bent rib 40 has the waveform shape, it is improved in rigidity to distortion such as bending as compared with the linear bent rib 40 of the first embodiment, and since the end portion of the upper lid flange portion 43 is formed so as to correspond to the waveform shape of the lower lid flange portion 43, such a correspondence can be utilized for positioning at a coupling time of the lower lid 22 and the upper lid 41, so that assembling easiness of the battery module 3 is further improved. End portions of the left side face, the upper face, and the right side face of the upper lid 41 are narrowed down on the front face and rear face portions of the lower lid 22, structural strength is increased and distortion of the upper lid 22 itself is reduced. Simultaneously therewith, since the strength is increased, the amount of material to be used can be decreased by reducing the plate thickness of the upper lid 22, and the weight and cost of the upper lid 22 can be reduced.

In the battery module 3 according to the embodiment, since the assembled battery units 2 are disposed and fixed between two block bases 11 with an approximate L shape in section arranged in parallel to be opposed to each other, the block base 11 has a high section coefficient owing to its approximate L shape in section, six assembled battery units 2 can be fixed on the flat faces, it is unnecessary to provide a fixing part for each assembled battery unit 2, so that weight reduction and space saving can be achieved, and effective function to size variations of the assembled battery units 2 can be obtained. Since the assembled battery block 20 is manufactured by electrically connecting the assembled battery units 2 arranged and fixed on the block bases 11 in series, handling of the battery module 3 is made easy in the assembling step. Since the battery module 3 is constituted by arranging two assembled battery blocks 20 in parallel and accommodating and fixing them in the exterior case, assembling easiness of the battery module 3 is considerably improved. Since the block reinforcing plates 19 with an approximate L shape in section are arranged above the assembled battery block 20 in parallel with the block bases 11, a structure which can endure large impacts in a vertical direction and a horizontal direction and which is adopted to a power source for an automobile can be obtained.

In the battery module 3 according to the above-described embodiment, since the lower lid 22 forms the duct 48 for each assembled battery block 20 and the ventilation hole 29 is formed so as to correspond to a portion between adjacent unit cells 1 constituting the assembled battery unit 2, such a structure that cooling air flows upwardly between adjacent unit cells 1 can be obtained, and since a temperature of cooling air flowing in the duct 48 is constant, air with a constant temperature strikes on respective unit cells 1 so that almost constant cooling condition can be obtained. A considerably efficient structure where a cooling system is completed by only forming the assembled battery block 20 fixed with assembled battery units 2 with the same shape having the louver function (the arch-shaped louver 6 and the cross-shaped louver 7) included therein on the lower lid 22 having the ducts 48 and the ventilation holes 29 can be obtained, where it is unnecessary to change a louver shape for each unit cell 1 and simple assembling is made possible. Since the opening area of the ventilation hole 39 on the introduction side of cooling is large while the opening areas of the ventilation holes 29 become smaller according to approaching to the discharge side, an approximate half of the ventilation hole nearest the introduction side is covered with the shielding louver 51, and the ventilation hole nearest the discharge side has approximately the same opening area as that of the ventilation hole nearest the introduction side, temperatures of the unit cells 1 can be kept approximately constant.

In the battery power source apparatus 100 according to the second embodiment, sine the lower lid 22 has the lower lid projections 52 on the bottom face (see FIG. 12) and the upper lid recesses 53 are formed on the upper lid 41, it is made possible to cause the lower projections 52 to engage the upper lid recesses 53 to conduct stacking arrangement of the battery modules 3, so that a three-dimensional arrangement of the battery modules 3 is made possible and an utilization rate of a space is improved as compared with a two-dimensional arrangement.

INDUSTRIAL APPLICABILITY

Since the present invention provides a battery module which is excellent in cooling performance of a battery and is improved in assembling easiness at low cast, it contributes to manufacture and sale of battery modules, so that industrial applicability can be achieved.

What is claimed is:
1. A battery module, comprising:
an exterior case formed in an approximately hexahedral shape; and
a battery block which is accommodated in the exterior case and which is constituted by a plurality of cylindrical unit cells
wherein the exterior case has a lower lid having three faces including a front face, a bottom face and a back face and an upper lid having three faces including a left side face, an upper face and a right side face, and is formed by combining the lower lid and the upper lid, end portions of the left side face, the upper face and the right side face of the upper lid being bent inwardly at substantially all of the edges of the sides of the front face and the back face of the lower lid to increase a bearing force of the exterior case against twisting,
and wherein the battery block is constituted by an assembled unit of said plurality of assembled cylindrical unit cells arranged in parallel and electrically connected such that alternating, adjacent positive and negative polarities of said plurality of cylindrical unit cells are fixedly arranged and are electrically connected to one another, the battery block being fixedly put on the lower lid in a state of the assembled unit, wherein positive and negative electrode output line taking-out ports are provided at the front face of the exterior case.

2. A battery module according to claim 1, wherein ventilation ports are provided in the front face and the back face of the exterior case.

3. A battery module according to claim 1, wherein the lower lid and the upper lid are fixed to each other such that first flange portions extending from a bottom face portion of the lower lid laterally correspond to second flange portions extending from left and right side faces of the upper lid laterally.

4. A battery module according to claim 3, wherein the first flange portions are positioned above the bottom face of the lower lid.

5. A battery module according to claim 3, wherein end portions of the first flange portions are bent upwardly.

6. A battery module according to claim 5, wherein the end portions of the first flange portions have a waveform shape.

7. A battery module according to claim 1, wherein the assembled batteries are arranged and fixed between two frames whose sections have an approximate h-shape and which are opposed to each other in parallel with each other, and a plurality of assembled battery groups, each assembled battery group being formed by electrically connecting the assembled batteries, are arranged in parallel and accommodated and fixed in the exterior case.

8. A battery module according to claim 7, wherein reinforcing plates with an approximate L-shape in section are arranged above the assembled battery groups so as to be parallel to the frames for arranging and fixing the assembled battery groups.

9. A battery module according to claim 7, wherein the lower lid has cooling ducts corresponding to the respective assembled battery groups arranged and each cooling duct has ventilation holes at portions corresponding to spaces between respective adjacent unit cells constituting each assembled battery.

10. A battery module according to claim 9, wherein opening areas of the ventilation holes are set such that their sizes decrease from one positioned nearest an introduction side of cooling air to one positioned toward to a discharge side of the cooling air, an approximate half of the ventilation hole nearest the introduction side is covered by an obliquely inclined rib, and the ventilation hole nearest the discharge side has an opening area approximately equal to that of the ventilation hole positioned nearest the introduction side.

11. A battery module according to claim 1, wherein the lower lid has a protrusion on its bottom face, and the upper lid has a recess at a portion corresponding to the protrusion such that the battery modules can be disposed in a stacked manner.

12. A battery module according to claim 11, wherein a plurality of retaining portions for retaining an approximately slender collar for allowing stacking and fixing of battery modules are formed on the left side face and the right side face of the upper lid.

13. A battery module where a plurality of assembled battery blocks are accommodated in an exterior case formed in an approximately hexahedral shape, each assembled battery block including a plurality of cylindrical unit cells electrically connected such that polarities thereof are alternating, and mechanically arranged in parallel, wherein the exterior case has a lower lid having a front face, a bottom face and a back face, and an upper lid having a left side face, an upper face and a right side face, end portions of the left side face, the upper face and the right side face of the upper lid being drawn at sides of the front face and the back face of the lower lid, and wherein the lower lid and the upper lid are fixed such that first flange portions extending from a bottom face portion of the lower lid laterally correspond to second flange portions extending from left and right side faces of the upper lid laterally, end portions of the first flange portions being bent upwardly and having a waveform shape, wherein positive and negative electrode output line taking-out ports are provided at the front face of the exterior case, and end portions of the left side face, the upper face, and the right side face of the upper lid are bent inwardly at substantially all of the edges of the sides of the front face and the back face of the lower lid to increase a bearing force of the exterior case against twisting.

14. A battery module, comprising:

an exterior case formed in an approximately hexahedral shape; and a battery block which is accommodated in the exterior case and which is constituted by a plurality of cylindrical unit cells, each of which has positive and negative polarities at opposite ends, wherein the exterior case has a lower lid having three faces including a front face, a bottom face and a back face and an upper lid having three faces including a left side face, an upper face and a right side face, and is formed by combining the lower lid and the upper lid, and wherein the battery block is constituted by an assembled unit of said plurality of assembled cylindrical unit cells arranged mechanically parallel to one another such that said positive and negative polarities of said unit cells are alternating and are fixedly arranged mutually adjacent and are electrically connected to one another, the battery block being fixedly put on the lower lid in a state of the assembled unit, wherein positive and negative electrode output line taking-out ports are provided at the front face of the exterior case, and end portions of the left side face, the upper face, and the right side face of the upper lid are bent inwardly at substantially all of the edges of the sides of the front face and the back face of the lower lid to increase a bearing force of the exterior case against twisting.

* * * * *